(12) United States Patent
Patterson et al.

(10) Patent No.: US 12,011,997 B2
(45) Date of Patent: Jun. 18, 2024

(54) SELF-BALANCING TWO-WHEELED VEHICLE

(71) Applicant: Spin Master Ltd., Toronto (CA)

(72) Inventors: Ian Patterson, Innisfil (CA); Robert Murray O'Brien, Ajax (CA); Daryl R. Tearne, Toronto (CA)

(73) Assignee: Spin Master Ltd., Toronto (CA)

( * ) Notice: Subject to any disclaimer, the term of this patent is extended or adjusted under 35 U.S.C. 154(b) by 0 days.

(21) Appl. No.: 18/157,136

(22) Filed: Jan. 20, 2023

(65) Prior Publication Data

US 2023/0150359 A1    May 18, 2023

Related U.S. Application Data

(63) Continuation of application No. 16/948,519, filed on Sep. 22, 2020, now Pat. No. 11,560,055, which is a
(Continued)

(51) Int. Cl.
*B62M 7/12*     (2006.01)
*B60B 19/00*   (2006.01)
(Continued)

(52) U.S. Cl.
CPC ........ *B60K 31/0083* (2013.01); *B60B 19/003* (2013.01); *B60B 19/125* (2013.01);
(Continued)

(58) Field of Classification Search
CPC .. B60K 31/0083; B60K 7/0007; B60K 31/12; B60K 2007/0046; B60K 2007/0061;
(Continued)

(56) References Cited

U.S. PATENT DOCUMENTS 523,533 A    7/1894  Leach
552,554 A    1/1896  Morton
(Continued)

FOREIGN PATENT DOCUMENTS

CN    2855792 Y    1/2007
CN  202448657 U    9/2012
(Continued)

OTHER PUBLICATIONS

Chinese Patent Application No. 201810864078.6—Office Action dated May 6, 2020 with English Translation May 6, 2020.

*Primary Examiner* — Kevin Hurley
*Assistant Examiner* — Marlon A Arce
(74) *Attorney, Agent, or Firm* — Aird & McBurney LP

(57) ABSTRACT

In an aspect, a self-balancing two-wheeled vehicle is provided, having a body, and first and second wheels rotatably coupled to the body. The second wheel has at least one lateral roller rotatable about an axis that is one of oblique and orthogonal to a rotation axis of the second wheel. At least one motor is coupled to the second wheel to control rotation of the second wheel and the at least one lateral roller. At least one sensor is coupled to the body to generate orientation data therefor. A control module is coupled to the at least one motor to control operation thereof at least partially based on the orientation data generated by the at least one sensor.

5 Claims, 13 Drawing Sheets

Related U.S. Application Data continuation of application No. 16/278,538, filed on Feb. 18, 2019, now Pat. No. 10,780,780, which is a continuation of application No. 16/023,498, filed on Jun. 29, 2018, now Pat. No. 10,245,952.

(60) Provisional application No. 62/614,474, filed on Jan. 7, 2018.

(51) Int. Cl.

| | | |
|---|---|---|
| *B60B 19/12* | (2006.01) | |
| *B60K 7/00* | (2006.01) | |
| *B60K 31/00* | (2006.01) | |
| *B60K 31/12* | (2006.01) | |
| *B62K 11/00* | (2006.01) | |
| *B62M 11/10* | (2006.01) | |
| *B62M 23/00* | (2006.01) | |
| *B62M 29/00* | (2006.01) | |
| *B62M 7/00* | (2010.01) | |

(52) U.S. Cl.
CPC ............ *B60K 7/0007* (2013.01); *B60K 31/12* (2013.01); *B62K 11/00* (2013.01); *B62M 7/12* (2013.01); *B62M 11/10* (2013.01); *B62M 23/00* (2013.01); *B62M 29/00* (2013.01); *B60K 2007/0046* (2013.01); *B60K 2007/0061* (2013.01); *B60K 2007/0092* (2013.01); *B60Y 2200/12* (2013.01); *B62M 7/00* (2013.01)

(58) Field of Classification Search
CPC .......... B60K 2007/0092; B60B 19/003; B60B 19/125; B60B 19/12; B62K 11/00; B62M 7/12; B62M 11/10; B62M 23/00; B62M 29/00; B62M 7/00; B60Y 2200/12; B60W 2050/0075; B60W 2300/36; B60W 2556/45; B60W 30/04; Y02T 10/72; B60L 15/20

See application file for complete search history.

(56) References Cited

U.S. PATENT DOCUMENTS

| | | |
|---|---|---|
| 553,552 A | 1/1896 | Beck |
| 8,424,621 B2 | 4/2013 | Uehara |
| 8,708,068 B2 | 4/2014 | Yada |
| 8,813,893 B2 | 8/2014 | Muto et al. |
| 9,027,693 B2 | 5/2015 | Muto et al. |
| 9,989,970 B1 | 6/2018 | Morey et al. |
| 11,194,341 B2 * | 12/2021 | He .......................... A47J 47/14 |
| 2008/0295595 A1 * | 12/2008 | Tacklind .............. B62K 11/007 |
| | | 73/462 |
| 2009/0264046 A1 | 10/2009 | Mayer |
| 2012/0009846 A1 | 1/2012 | Miller |
| 2012/0181846 A1 | 7/2012 | Liddiard |
| 2015/0025156 A1 | 1/2015 | Hillman et al. |
| 2015/0251563 A1 | 9/2015 | Shirokura et al. |
| 2019/0161132 A1 * | 5/2019 | Wiley ................... B62D 37/06 |
| 2022/0133559 A1 | 5/2022 | Brewer |

FOREIGN PATENT DOCUMENTS

| | | |
|---|---|---|
| CN | 103079838 A | 5/2013 |
| CN | 103079838 B | 3/2016 |
| EP | 2664526 A1 | 11/2013 |

* cited by examiner

SELF-BALANCING TWO-WHEELED VEHICLE

CROSS-REFERENCE TO RELATED APPLICATIONS

This application is a continuation of U.S. application Ser. No. 16/948,519 filed Sep. 22, 2020, which is a continuation of U.S. application Ser. No. 16/278,538, filed Feb. 18, 2019, which is now granted as U.S. Pat. No. 10,780,780, which is a continuation of U.S. application Ser. No. 16/023,498, filed Jun. 29, 2018, which is now granted as U.S. Pat. No. 10,245,952 and which claims priority to and the benefit of U.S. Provisional Patent Application No. 62/614,474, filed Jan. 7, 2018, the contents of all of which are incorporated herein in their entirety.

FIELD

The specification relates generally to two-wheeled vehicles. In particular, the following relates to a self-balancing two-wheeled vehicle.

BACKGROUND OF THE DISCLOSURE

Toy vehicles are constructed to entertain both young and old children. The toy vehicles are intended to simulate the motion of actual real-world vehicles, such as cars, motorcycles, etc. In the case of traditionally two-wheeled vehicles, such as motorcycles, however, additional "training" wheels are generally provided to enable the two-wheeled vehicles to maintain their balance in an upright position. In some cases, these toy vehicles are remotely controlled via either a remote controller or an application executing on a mobile device that communicates with the toy vehicle either tethered or wirelessly to enable a person to modify the behavior of the toy vehicle. While such toy vehicles simulate basic movements of their real world counterparts, the expectations of users have been heightened as a result of the effects in modern movies and simulation games, such as auto racing games.

SUMMARY OF THE DISCLOSURE

In one aspect, there is provided a self-balancing two-wheeled vehicle, comprising a body, a first wheel rotatably coupled to the body, a second wheel rotatably coupled to the body, the second wheel having at least one lateral roller rotatable about an axis that is one of oblique and orthogonal to a rotation axis of the second wheel, the self-balancing two-wheeled vehicle further comprising at least one motor coupled to the second wheel to control rotation of the second wheel and the at least one lateral roller, at least one sensor coupled to the body to generate orientation data therefor, and a control module coupled to the at least one sensor and the at least one motor to control operation thereof at least partially based on the orientation data generated by the at least one sensor.

The second wheel can have a first drive interface and a second drive interface to which the at least one motor is coupled, and the first drive interface can be rotatable independent of the second drive interface. A first of the at least one motor can be coupled to the first drive interface and a second of the at least one motor can be coupled to the second drive interface. The second wheel can have a plurality of lateral rollers. Rotation of the lateral rollers can be at least partially based on a difference in angular velocity of the first drive interface and the second drive interface. Each lateral roller can be rotated by a transmission translation member engaged by at least one gear, each of the at least one gear being rotated via one of the first drive interface and the second drive interface. A first of the at least one gear can be rotated via the first drive interface and a second of the at least one gear can be rotated via the second drive interface.

The first drive interface can fully control rotation of the rear wheel about a rear axle.

The at least one sensor can include an accelerometer that generates acceleration data, and the control module can control operation of the at least one motor at least partially based on the accelerometer data received from the accelerometer.

The self-balancing two-wheeled vehicle can further comprise a receiver coupled to the control module to communicate operational commands received from a remote control unit to the control module, the remote control unit having a set of user controls and communicating the operational commands generated by actuation of the user controls, the control module controlling the at least one motor at least partially based on the operational commands. The control module can at least partially control the at least one motor to maintain a center-of-gravity of the self-balancing two-wheeled vehicle over an area of contact of the first wheel and the second wheel with a travel surface. The first wheel can be pivotable relative to the body, and pivoting of the first wheel can be controlled by the control module at least partially based on the operational commands received from the remote control unit. Pivoting of the first wheel can be at least partially controlled by the control module to maintain the center-of-gravity of the self-balancing two-wheeled vehicle over the area of contact of the first wheel and the second wheel with the travel surface.

The operational commands can include a wheelie command, and the remote control unit, upon receiving the wheelie command from the remote control unit, can control the second wheel to accelerate in a first direction away from the first wheel and immediately subsequently accelerate in a second direction towards the front wheel to reorient the self-balancing two-wheeled vehicle so that the center-of-gravity of the self-balancing two-wheeled vehicle is over the area of contact of the second wheel with the travel surface, wherein the control module controls the at least one motor at least partially to maintain the center-of-gravity of the self-balancing two-wheeled vehicle is over the area of contact of the second wheel with the travel surface.

In another aspect, there is provided a self-balancing two-wheeled vehicle, comprising a body, a first wheel rotatably coupled to the body, a second wheel rotatably coupled to the body, the second wheel having at least one lateral roller rotatable about a roller axis that is one of oblique and orthogonal to a rotation axis of the second wheel, at least one motor coupled to the second wheel to control rotation of the second wheel and the at least one lateral roller, at least one sensor coupled to the body to generate orientation data therefor, a control module coupled to the at least one sensor and the at least one motor to control operation thereof at least partially based on the orientation data generated by the at least one sensor, and a receiver coupled to the control module to communicate operational commands received from a remote control unit to the control module, the remote control unit having a set of user controls and communicating the operational commands generated by actuation of the user controls, wherein the control module at least partially controls the at least one motor at least partially based on the operational commands to urge the self-balancing two-wheeled vehicle towards a position in which the center-of-gravity of the self-balancing two-wheeled vehicle is over the area of contact of the second wheel with the travel surface, and wherein the operational commands comprise a wheelie command, and wherein the control module, upon receiving the wheelie command from the remote control unit, controls the second wheel to accelerate in a first direction away from the first wheel and immediately subsequently accelerate in a second direction towards the front wheel to urge the self-balancing two-wheeled vehicle towards the position in which the center-of-gravity of the self-balancing two-wheeled vehicle is over the area of contact of the second wheel with the travel surface.

The at least one motor can include at least two motors, and a first of the at least two motors can be coupled to the first drive interface and a second of the at least two motors can be coupled to the second drive interface.

The second wheel can have a plurality of lateral rollers, and rotation of the lateral rollers can be at least partially based on a difference in angular velocity of the first drive interface and the second drive interface.

Each lateral roller can be rotated by a transmission translation member engaged by at least one gear, each of the at least one gear being rotated via one of the first drive interface and the second drive interface.

The at least one sensor can include an accelerometer that generates acceleration data, and the control module can control operation of the at least one motor at least partially based on the accelerometer data received from the accelerometer.

The self-balancing two-wheeled vehicle can further include a receiver coupled to the control module to communicate operational commands received from a remote control unit to the control module, the remote control unit having a set of user controls and communicating the operational commands generated by actuation of the user controls, wherein the control module controls the at least one motor at least partially based on the operational commands.

The control module can at least partially control the at least one motor, and wherein the first wheel is pivotable relative to the body, and pivoting of the first wheel can be controlled by the control module at least partially based on the operational commands received from the remote control unit.

Pivoting of the first wheel can be at least partially controlled by the control module to urge the self-balancing two-wheeled vehicle towards the position in which the center-of-gravity of the self-balancing two-wheeled vehicle is over the area of contact of the first wheel and the second wheel with the travel surface.

BRIEF DESCRIPTIONS OF THE DRAWINGS

For a better understanding of the various embodiments described herein and to show more clearly how they may be carried into effect, reference will now be made, by way of example only, to the accompanying drawings in which.

DETAILED DESCRIPTION

Figure 1:
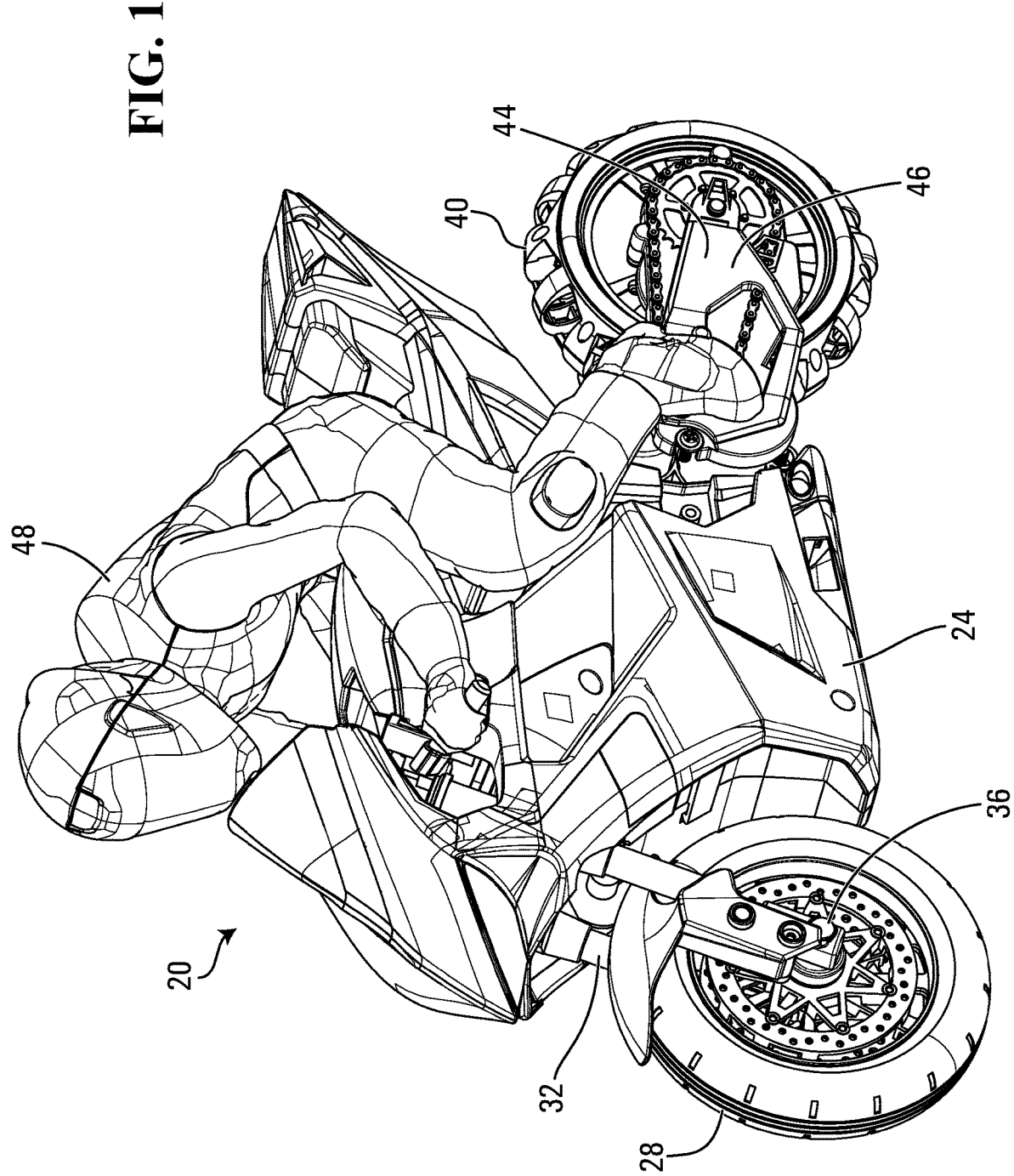
FIG. 1 shows a toy motorcycle having a composite wheel in accordance with one embodiment thereof.

For simplicity and clarity of illustration, where considered appropriate, reference numerals may be repeated among the Figures to indicate corresponding or analogous elements. In addition, numerous specific details are set forth in order to provide a thorough understanding of the embodiments described herein. However, it will be understood by those of ordinary skill in the art that the embodiments described herein may be practiced without these specific details. In other instances, well-known methods, procedures and components have not been described in detail so as not to obscure the embodiments described herein. Also, the description is not to be considered as limiting the scope of the embodiments described herein.

Various terms used throughout the present description may be read and understood as follows, unless the context indicates otherwise: "or" as used throughout is inclusive, as though written "and/or"; singular articles and pronouns as used throughout include their plural forms, and vice versa; similarly, gendered pronouns include their counterpart pronouns so that pronouns should not be understood as limiting anything described herein to use, implementation, performance, etc. by a single gender; "exemplary" should be understood as "illustrative" or "exemplifying" and not necessarily as "preferred" over other embodiments. Further definitions for terms may be set out herein; these may apply to prior and subsequent instances of those terms, as will be understood from a reading of the present description.

Any module, unit, component, server, computer, terminal, engine or device exemplified herein that executes instructions may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by an application, module, or both. Any such computer storage media may be part of the device or accessible or connectable thereto. Further, unless the context clearly indicates otherwise, any processor or controller set out herein may be implemented as a singular processor or as a plurality of processors. The plurality of processors may be arrayed or distributed, and any processing function referred to herein may be carried out by one or by a plurality of processors, even though a single processor may be exemplified. Any method, application or module herein described may be implemented using computer readable/executable instructions that may be stored or otherwise held by such computer readable media and executed by the one or more processors.

A self-balancing two-wheeled vehicle is provided. A two-wheeled vehicle is any type of vehicle having two wheels as its only means of ground contact during normal operation for travel over and resting on a travel surface, such as, for example, a floor, a road, a dirt path, etc. The two wheels are at least sometimes "in line"; that is, they often share a common plane. Examples of two-wheeled vehicles include bicycles and motorcycles whose front wheels, when oriented for travel in a straight line, share a common plane with their rear wheels.

The two-wheeled vehicle has a body, and first and second wheels rotatably coupled to the body. The second wheel has at least one lateral roller rotatable about an axis that is one of oblique and orthogonal to a rotation axis of the second wheel. At least one motor is coupled to the second wheel to control rotation of the second wheel and the at least one lateral roller. At least one sensor is coupled to the control module and generates orientation data. A control module is coupled to the at least one motor to control operation thereof at least partially based on the orientation data generated by the at least one sensor.

By controlling rotation of the second wheel and the at least one lateral roller at least partially based on the orientation data generated by the at least one sensor, the upright orientation of the two-wheeled vehicle can be maintained where a two-wheeled vehicle would otherwise normally be unable to maintain its balance in an upright position (that is, with only its two wheels contacting a travel surface).

Further, various maneuvers can be carried out by the two-wheeled vehicle. For example, the two-wheeled vehicle can simulate a "drifting" motion, wherein the rear wheel can appear to be travelling along a path that is not normal to the rotation axis thereof. Still further, the two-wheeled vehicle can be configured to perform a "wheelie", wherein the two-wheeled vehicle is reoriented so that the two-wheeled vehicle balances itself on its rear wheel.

FIG. 1 shows a self-balancing two-wheeled vehicle in accordance with an embodiment. The self-balancing two-wheeled vehicle is a toy motorcycle 20 that has a front wheel 28 that is coupled to the body 24 via a front wheel support in the form of a set of forks 32. The front wheel 28 freely rotates about an axle 36 that is held between the forks 32.

The forks 32 are secured in a fixed position and orientation to the body 24 of the toy motorcycle 20. A rear wheel 40 is rotatably coupled to a rear wheel support 44 that extends from the body 24. A rider figurine 48 is positioned atop of the body 24 in a riding position, clutching at the handlebars that are connected to the forks 32 as if to steer the toy motorcycle 20.

Figure 2:
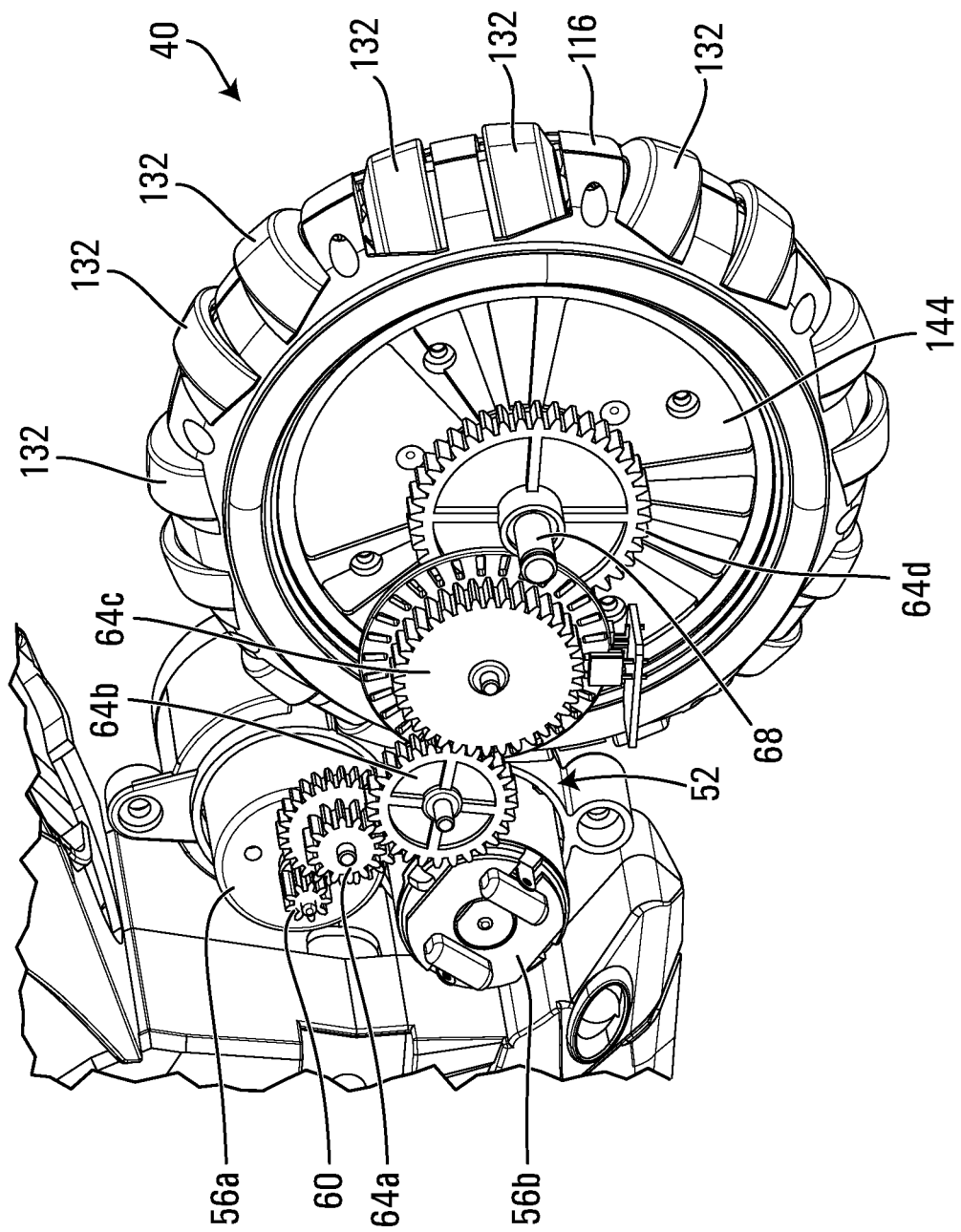
FIG. 2 is a partially disassembled view of a rear portion of the toy motorcycle of FIG. 1.
Figure 3:
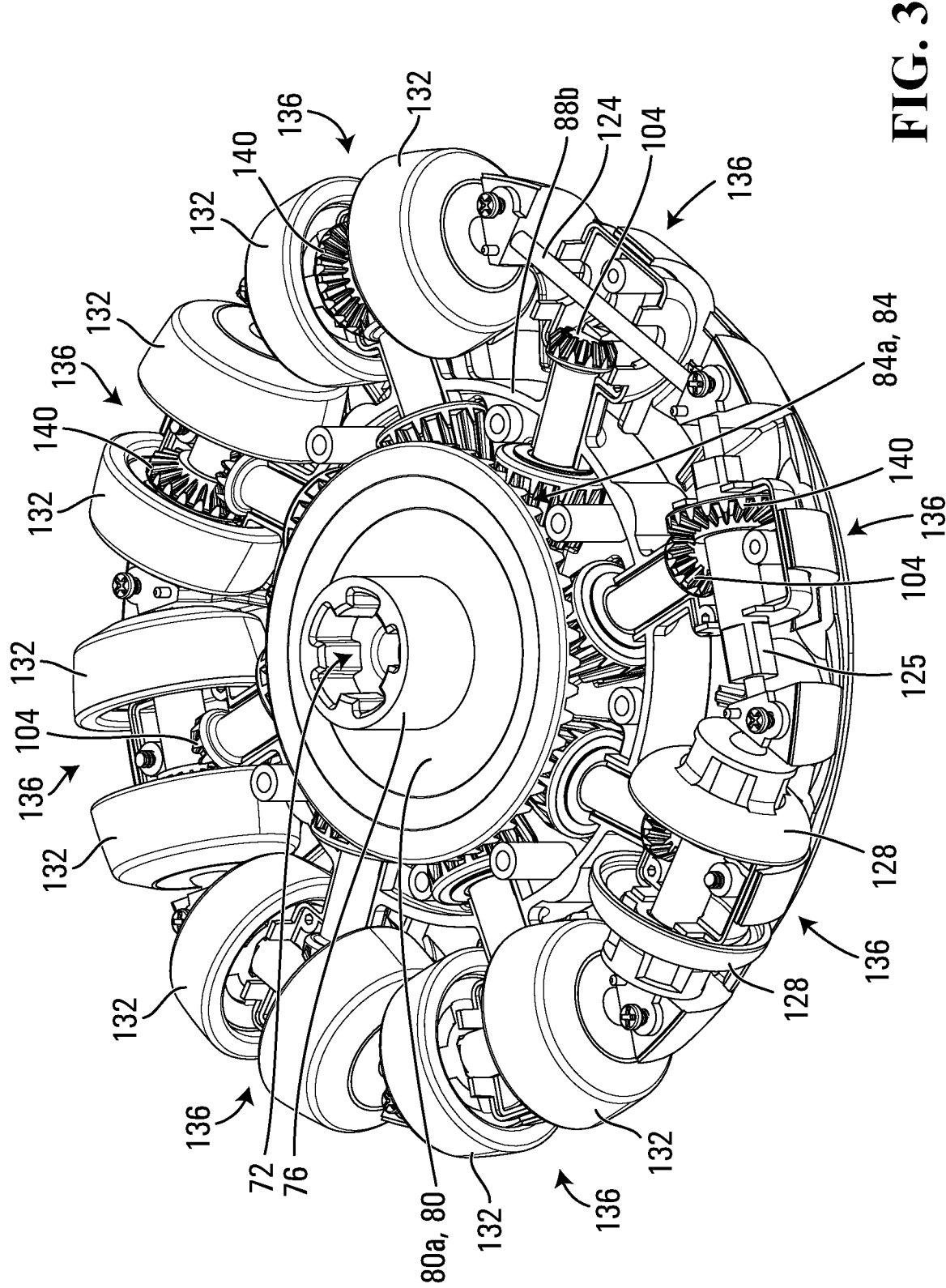
FIG. 3 is a perspective view of the partially disassembled composite wheel shown in FIG. 1.
Figure 4:
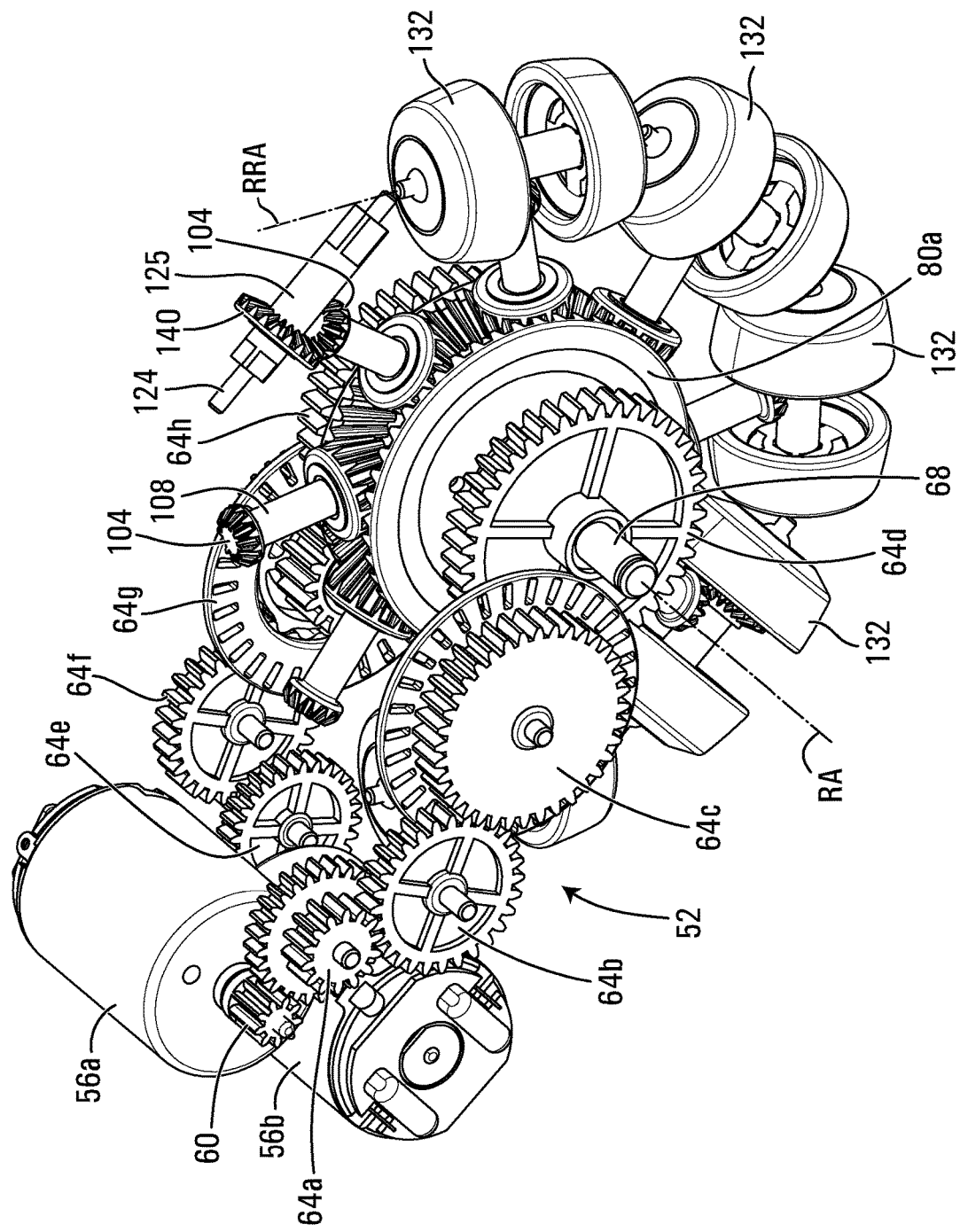
FIG. 4 shows a drive assembly coupled to gears driving a plurality of peripheral translation assemblies of the composite wheel of FIG. 3.
Figure 5:
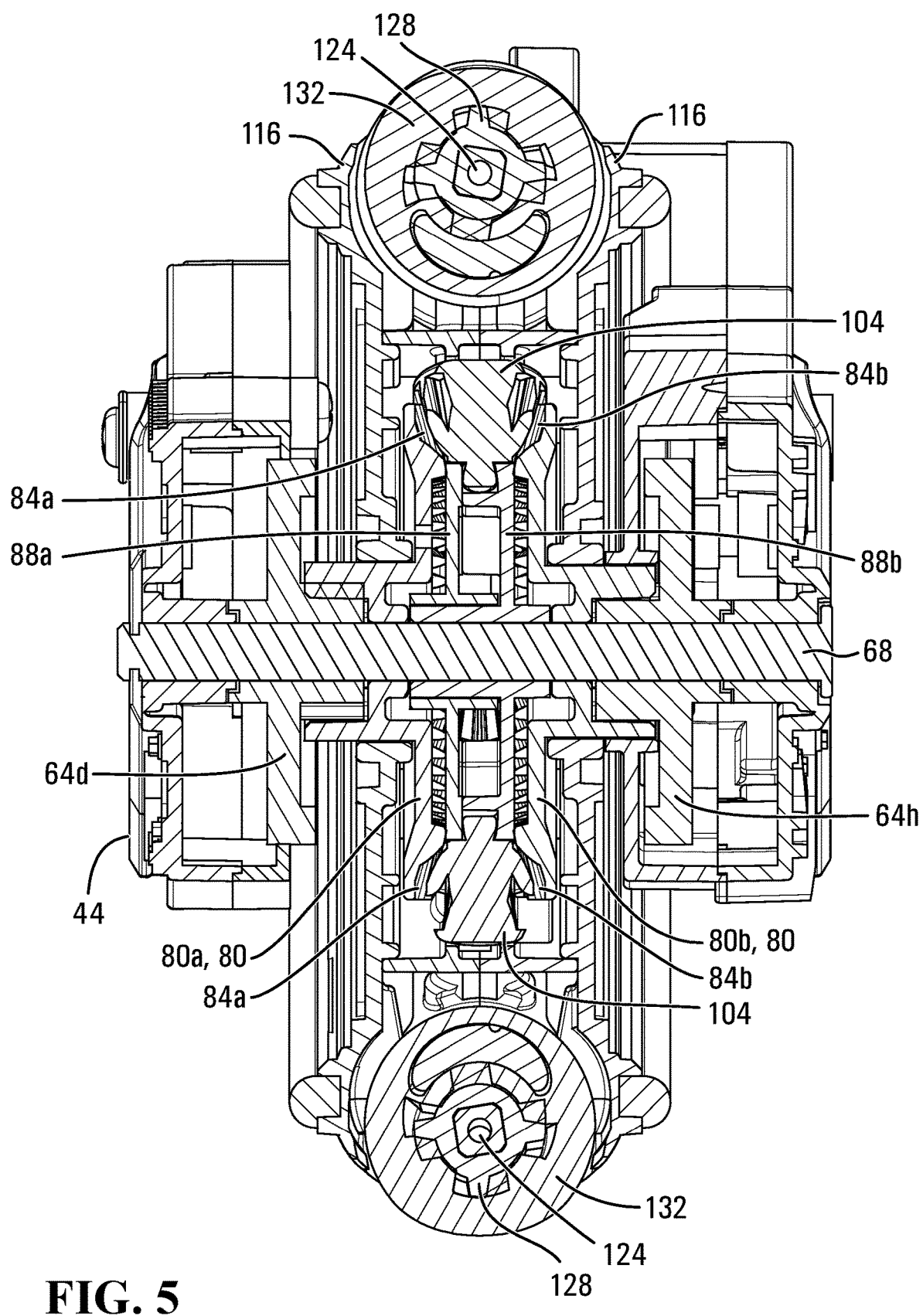
FIG. 5 is a rear section view of the rear portion of the toy motorcycle of FIG. 2 illustrating various components of the composite wheel.
Figure 6:
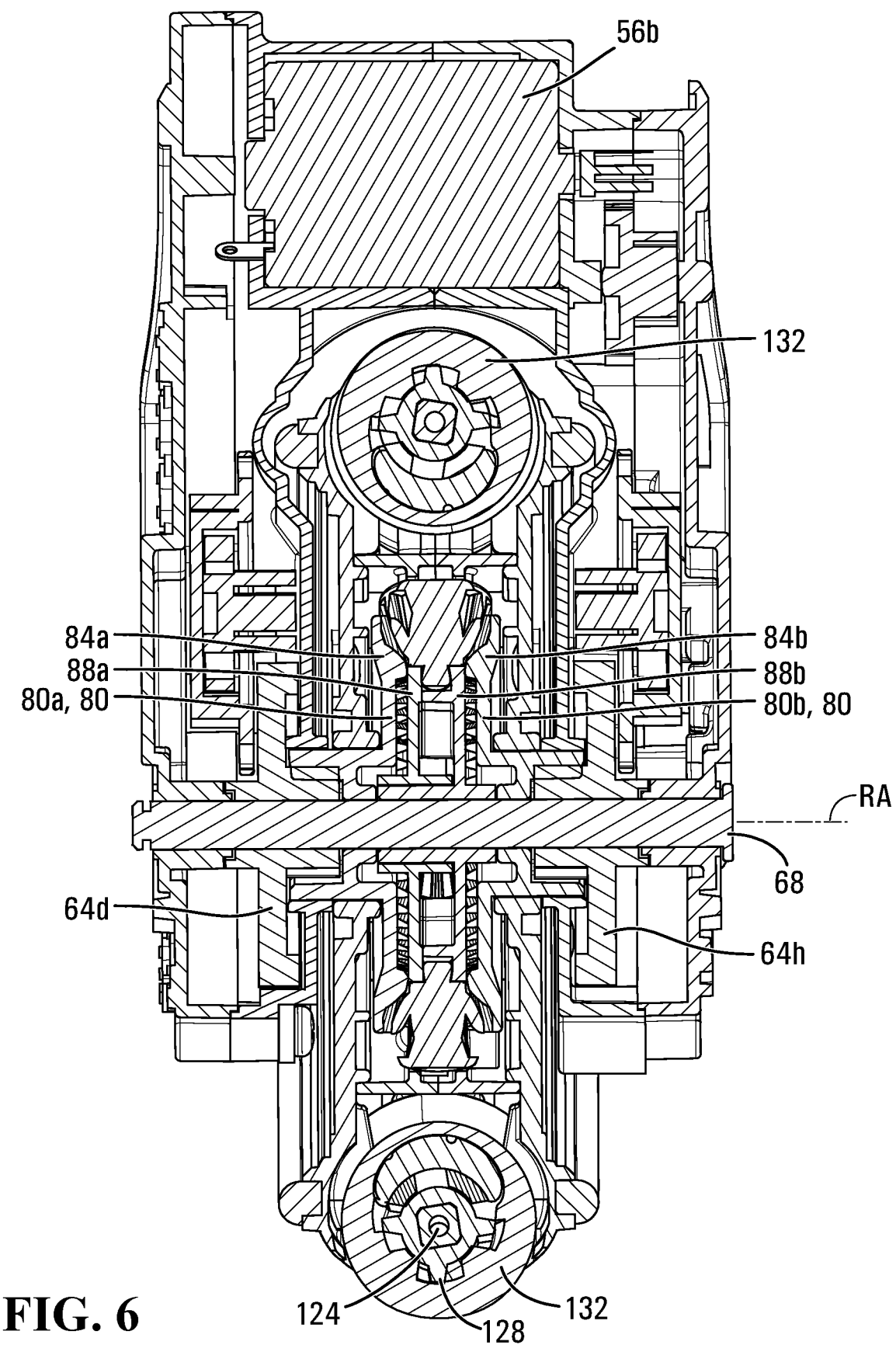
FIG. 6 is a top section view of the rear portion of the toy motorcycle of FIG. 2 illustrating various components of the composite wheel.

FIG. 2 shows a drive arrangement 52 within the rear wheel support 44 after removal of a rear wheel support cover 46. The drive arrangement 52 includes a first rear wheel control motor 56a (which may, for simplicity, be referred to as a first motor 56a), which has a drive gear 60 that engages a first of four intermediate drive gears 64a to 64d that are coupled together to transmit torque from the first motor 56a to a first (left) side of the rear wheel 40. The fourth intermediate drive gear 64d is rotatably mounted on a rear axle 68. The drive arrangement 52 also includes a second rear wheel control motor 56b (which may, for simplicity, be referred to as a second motor 56b), which drives another set of intermediate drive gears coupled together to transmit torque from the second motor 56b to a second (right) side of the rear wheel 40. The first and second motors 56a, 56b are battery-powered electric motors as will be described below. While, in the illustrated embodiment, each side employs four intermediate drive gears, other drive arrangements with other numbers of drive gears can be employed in alternative embodiments. In a further embodiment, the motors can be coupled directly to the sides of the rear wheel.

The construction of the rear wheel 40 and its operation in conjunction with the drive arrangement 52 will now be described in relation to FIGS. 2 to 6. The rear wheel 40 is a composite wheel as at least some components thereof do not simply rotate about a rotation axis RA of the rear wheel 40, but move in other manners, as will be described. The fourth intermediate drive gear 64d has a wheel-engaging projection 66 with a rectangular profile that extends towards the rear wheel 40. The wheel-engaging projection 66 is received within a similarly profiled recess 72 of a drive interface in the form of a projection bracket 76 extending outwardly from a first (left) gear disk 80a that is also rotatably mounted on the rear axle 68. The wheel-engaging projection 66 engages the interior sides of the recess 72 of the projection bracket 76 such that rotation of the fourth intermediate drive gear 64d causes the first gear disk 80a to rotate. Any other suitable configurations for transferring torque from the drive arrangements to the first gear disk 80a can be employed. The first gear disk 80a acts as a gear and has a toothed gear face 84a extending inwardly along a circular periphery thereof.

A second gear disk 80b has a drive interface in the form of a projection bracket 76 that is similarly engaged by the wheel-engaging projection 66 of a fourth intermediate drive gear 64h of a second set of intermediate drive gears 64e to 64h. Both the second gear disk 80b and the fourth intermediate drive gear 64h are rotatably mounted on the rear axle 68. The second gear disk 80b acts as a gear and has a toothed gear face 84b extending inwardly along a circular periphery thereof similar to the gear face 84a of the first gear disk 80a.

The drive interfaces enable the motors 56a, 56b to control operation of the rear wheel 40. In this particular embodiment, the drive interfaces enable the motors 56a, 56b to control operation of the gear disks 80a, 80b which control operation of the rear wheel 40 as is described herein. While, in the illustrated and described embodiments here, the drive interfaces are non-round drive recesses, any other suitable feature(s) for enabling the motors 56a, 56b to control operation of the rear wheel 40 can be employed, such as a set of one or more projections, a set of two or more recesses, or a combination of recesses and projections.

In an alternative embodiment, a single motor can be employed and use a variable transmission to provide different torque to each of the gear disks 80a, 80b in place of the two motors.

Positioned intermediate the first gear disk 80a and the second gear disk 80b is a support frame made from a first support frame portion 88a and a second support frame portion 88b. The support frame is freely rotatably mounted on the rear axle 68. The support frame portions 88a, 88b define eight recesses. A transmission translation member 96 is freely rotatably mounted within each of the recesses of the support frame. Each transmission translation member 96 has a frustoconical gear 100 that is dimensioned to fit between and engage the gear faces 84a, 84b of the first and second gear disks 80a, 80b. A roller control element in the form of a peripheral gear face 104 is coupled to the frustoconical gear 100 via a neck 108 that is freely rotatably secured between the support frame portions 88a, 88b. The transmission translation members 96 are mounted within the recesses of the support frame so that they rotate around axes that are perpendicular to the rotation axis RA of the rear wheel 40, but do not intersect it. In some alternative embodiments, the transmission translation members 96 can be mounted so that they rotate about axes that are radial relative to the rotation axis RA of the rear wheel 40. In some alternative embodiments, the transmission translation members 96 can be mounted on axles of a support frame that are perpendicular to the rotation axis RA of the rear wheel 40.

Two wheel shell portions 116 are secured to the support frame portions 88a, 88b and are freely rotatably mounted on the cylindrical exterior of the projection brackets 76 of the gear disks 80a, 80b. The two wheel shell portions 116 mate together to form a wheel shell. The wheel shell portions 116 have a structure therein to rotatably support eight axles 124 that are aligned with corresponding apertures in the shell formed by the shell portions 116. A roller hub 125 is mounted on each axle 124. Each roller hub 125 has a roller gear face 140 that meshes with the peripheral gear face 104 of a corresponding transmission translation member 96. Rotation of the transmission translation members 96 is translated into rotation of the roller hub 125 via engagement of the peripheral gear face 104 with the roller gear face 140. Two roller supports 128 are mounted on the roller hubs 125 and a lateral roller 132 is positioned over each of the roller supports 128. The lateral rollers 132 rotate about a central axis RRA of the axles 124 that is orthogonal to the rotational axis RA of the gear disks 80a, 80b. In alternative embodiments, the lateral rollers can be designed to rotate about axes that are oblique to the rotational axis RA of the gear disks. The lateral rollers 132 have an exterior surface 136 with an arcuate profile, and are preferably made from a soft, grippy material, such as rubber or polyurethane. The arrangement of the lateral rollers 132 protruding through the shell apertures 126 and the arcuate profile of the exterior surfaces 136 are such that the arcuate profiles define a generally circular outer profile of the rear wheel 40.

A side cover plate 144 covers an open side of each wheel shell portion 116.

Operation of the rear wheel 40 is controlled by the motors 56a, 56b, which act to drive rotation of the first and second gear disks 80a, 80b independent of one another. The motor 56a transfers torque to the first gear disk 80a via the intermediate drive gears 64a to 64d, thus controlling its rotation relative to the body 24 of the toy motorcycle 20. Similarly, the motor 56b transfers torque to the second gear disk 80a via the intermediate drive gears 64e to 64h, thus controlling its rotation relative to the body 24. The gear disks 80a, 80b are rotated about the rear axle 68 and thus the rotation axis RA that is coaxial to the rear axle 68. As each gear disk 80a, 80b rotates, its respective gear face 84a, 84b urges the teeth of the frustoconical gears 100 of the transmission translation members 96 to move in the same angular direction.

In order to cause the rear wheel 40 to act as a conventional wheel, the motors 56a, 56b are operated to rotate the first gear disk 80a and the second disk gear 80b at the same angular velocity (that is, with the same angular speed and direction) about the rear axle 68. As the gear faces 84a, 84b of the gear disks 80a, 80b are simultaneously rotated at the same angular velocity, they engage the teeth of the frustoconical gears 100 of the transmission translation members 96, trapping the frustoconical gears 100 between them. The transmission translation members 96 freely rotate within the recesses between the support frame portions 88a, 88b, which is freely rotatable about the rear axle 68. The trapped frustoconical gears 100 of the transmission translation members 96 are thus rotated with the gear disks 80a, 80b as they rotate. The exterior surfaces 136 of the lateral rollers 132 provide a somewhat continuous surface that simulates the travel surface of a conventional motorcycle tire. In this mode, the motors 56a, 56b can be operated to rotate the gear disks 80a, 80b at the same angular speed in either a first angular (forward rotational) direction, causing the rear wheel 40 to rotate to drive the toy motorcycle 20 forward, or in a second angular (backward rotational) direction, causing the rear wheel 40 to rotate to drive the toy motorcycle 20 backward.

The motors 56a, 56b can also be operated to rotate the first gear disk 80a at a different angular velocity than the second gear disk 80b about the rear axle 68. That is, at least one of the angular speed and the angular direction of rotation of the first gear disk 80a differs from that of the second gear disk 80b. The difference in angular velocity between the gear disks 80a, 80b causes the gear faces 84a, 84b of the gear disks 80a, 80b to rotate relative to one another. As the gear disks 80a, 80b rotate relative to one another, the gear faces 84a, 84b simultaneously rotate all of the frustoconical gears 100 of the transmission translation members 96. The transmission translation members 96 rotate about their rotation axes at a rate that is proportional to the difference in the angular velocities of the gear disks 80a, 80b.

The transmission translation members 96 and the lateral rollers 132 act as peripheral translation assemblies to transfer torque applied by the gear disks 80a, 80b to the lateral rollers 132 to cause rotation of the lateral rollers 132. As the transmission translation members 96 rotate, engagement of the edge of the rotating peripheral gear faces 104 with the circumferential recess patterns 140 on the lateral rollers 32 causes the lateral rollers 132 to rotate according to the rotational direction and speed of the transmission translation members 96, thereby translating the torque of the transmission translation members 96 about their rotation axes transmitted to the lateral rollers 132. Further, the support frame portions 88a, 88b and the transmission translation members 96 positioned therebetween rotate about the rear axle 68 at an angular velocity that is the average of the angular velocities of the gear disks 80a, 80b.

Figure 7:
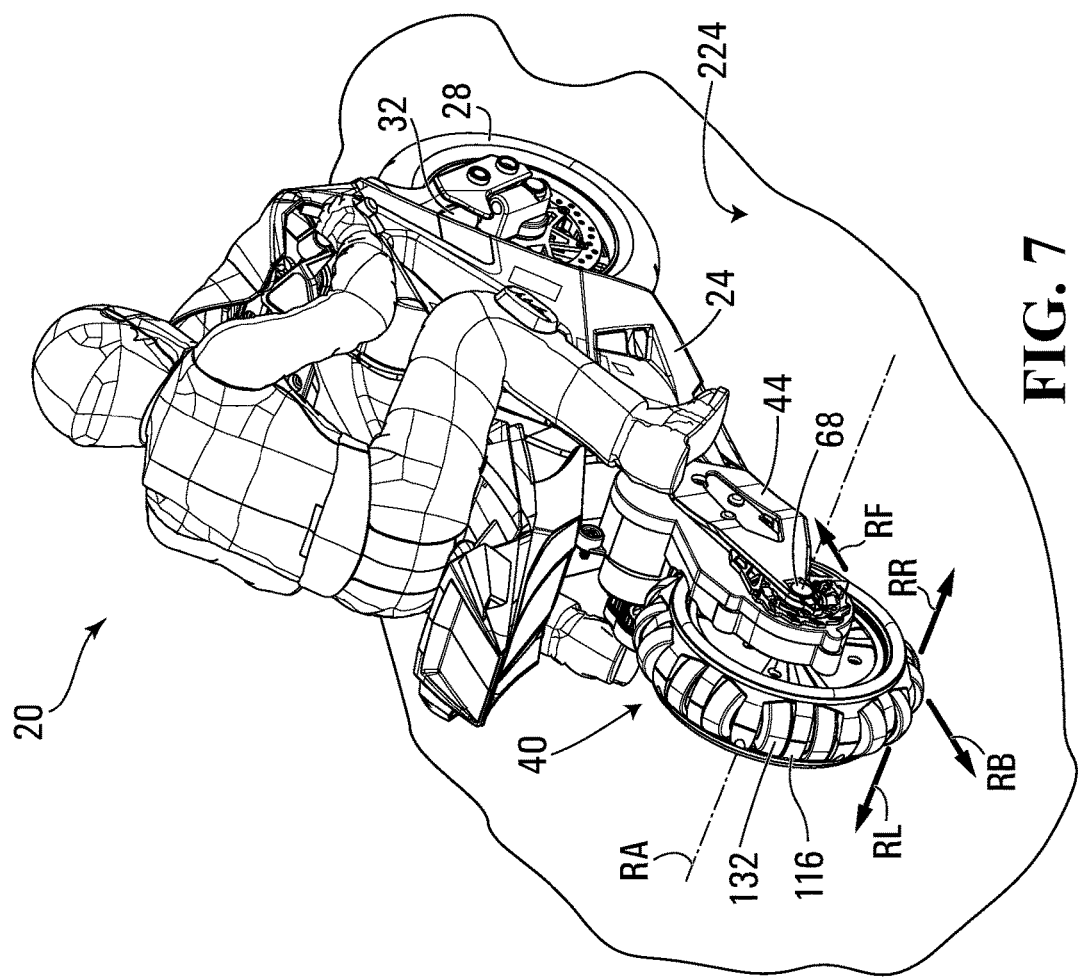
FIG. 7 shows the toy motorcycle on a travel surface.

FIG. 7 shows the toy motorcycle 20 positioned on a travel surface 224. The rear wheel 40 of the toy motorcycle 20 can be operated to drive the rear wheel 40 relative to the travel surface 224 in a forward direction RF or a backward direction RB, and, simultaneously, in a left direction RL or a right direction RR, as will be discussed below.

Figure 8:
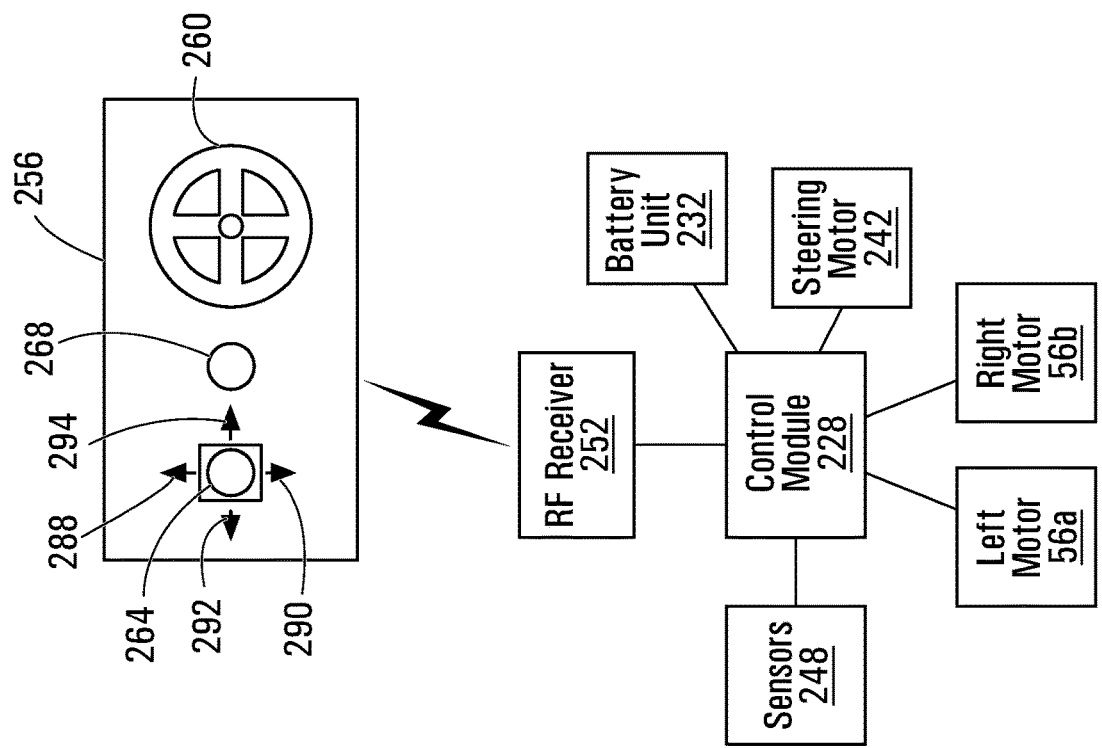
FIG. 8 is a schematic diagram showing various electronic components of the toy motorcycle of FIGS. 1 to 7.

FIG. 8 shows various physical and/or logical components of the toy motorcycle 20 that act to control its movement. A control module 228 is coupled to a battery unit 232, to the left rear wheel control motor 56a controlling rotation of the first gear disk 80a, to the right rear wheel control motor 56b controlling rotation of the second gear disk 80b, and to a front wheel steering motor 242. The left rear wheel control motor 56a and the right rear wheel control motor 56b may, for simplicity, be referred to simply as the left motor 56a and the right motor 56b respectively. The front wheel steering motor 242 controls pivoting of the forks 32 and, thus, the front wheel 28. A set of sensors 248 are coupled to the control module 228. The sensors 248 include orientation sensors for determining the orientation of the toy motorcycle 20 and an inertial measurement unit ("IMU") for determining its acceleration. The battery unit 232 includes one or more batteries for powering the left motor 56a and the right motor 56b, as well as the control module 228 and the sensors 248. The control module 228 controls the direction of rotation of each motor 56a, 56b, as well as its speed of rotation. In doing so, the control module 228 controls the power supplied by the battery unit 232. An RF receiver 252 is coupled to the control module 228 for receiving operation commands via radio frequency signals sent by a remote control unit 256.

As shown, the remote control unit 256 has a set of user controls, including a steering wheel 260, a joystick 264, and a wheelie button 268. In response to user interaction with the controls, the remote control unit 256 generates operation commands, such as "turn left x units", "drive forward with y speed units and drive left with z speed units" (where the units are interpreted by the control module 228), and "perform a wheelie". While the remote control unit 256 in this embodiment communicates operational commands via radio frequency, the remote control unit 256 may communicate with the toy motorcycle 20 via wired communications, Bluetooth, or any other suitable means in other embodiments.

Figures 9, 10:
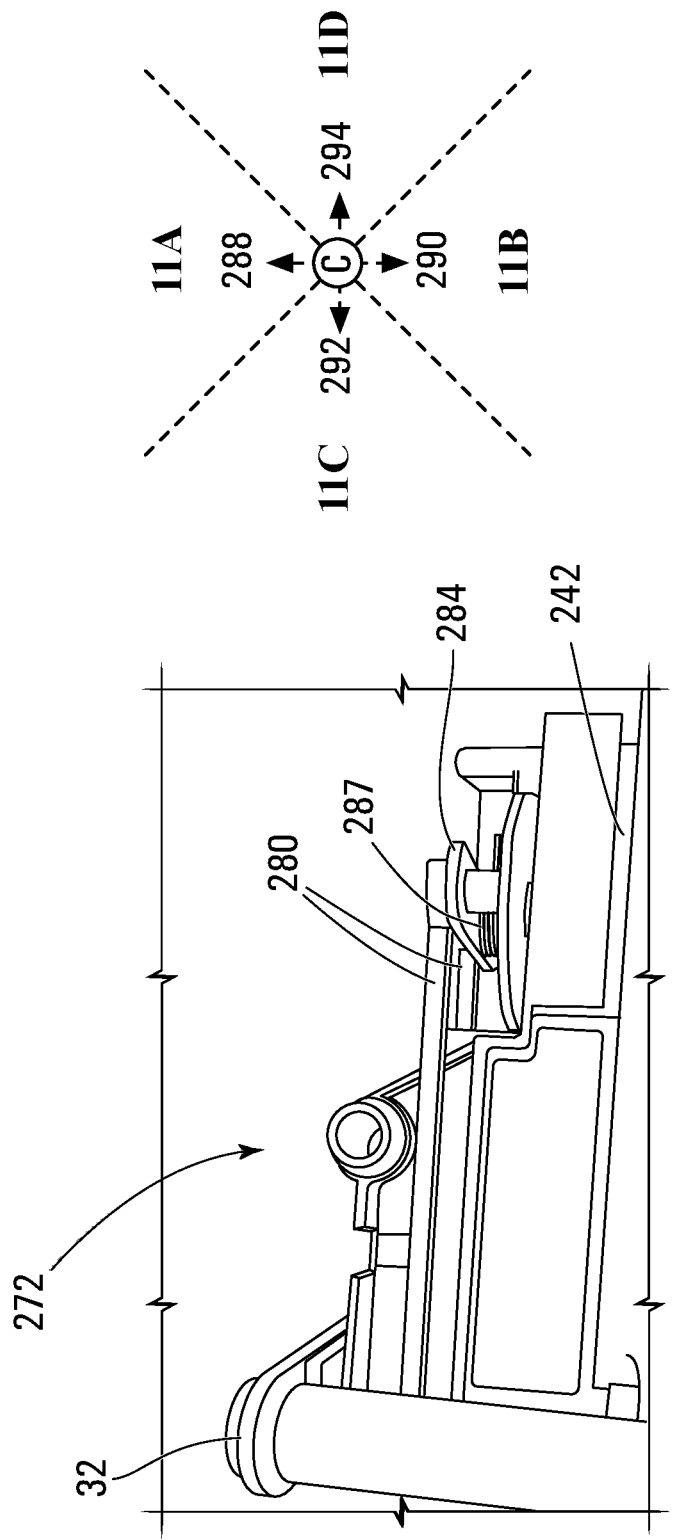
FIG. 9 shows a steering assembly of the toy motorcycle of FIGS. 1 to 7.
FIG. 10 shows the joystick of the remote control unit of FIG. 8 and directional regions to which the joystick can be moved.

FIG. 9 shows a steering assembly 272 of the toy motorcycle 20. The steering assembly 272 includes the front wheel steering motor 242 that is controlled by operation commands in the form of steering commands generated by the remote control unit 256 (FIG. 8) as a result of turning the steering wheel 260. Two rigid steering rods 280 (FIG. 9) are pivotally coupled to laterally opposite ends of a motor output member 284 that is driven by the front wheel steering motor 242. The steering rods 280 are pivotally coupled to opposite sides of the head assembly 32, so that pivoting of the motor output member 284 by the front wheel steering motor 242 in a first or second direction pivots the head assembly 32 (in the first or second direction) and thus the front wheel 28 (FIG. 7). A centering spring 287 is optionally provided so that when the steering wheel 260 (FIG. 8) is released by the user, the front wheel steering motor 242 may be de-powered, and the centering spring 287 (FIG. 9) returns the head assembly 32 back to a home position in which the front wheel 28 (FIG. 7) is pointed directly forward.

Now with reference to FIGS. 7, 8, and 10, the joystick 264 is biased to return to a center position C when not urged in another direction. The joystick 264 has two degrees of movement. When the joystick 264 is pivoted away from the center position C, the remote control unit 256 transmits operation commands in the form of drive commands to the toy motorcycle 20 to control operation of the motors of the toy motorcycle 20 (not shown, but similar in design and operation to the motors 56a, 56b of the toy motorcycle 20 of FIG. 1) coupled to the two gear disks 80a, 80b. Pivoting of the joystick 264 in a forward direction 288 or a backward direction 290 controls the average rotation speed of the gear disks 80a. Similarly, pivoting of the joystick 264 in a left direction 292 or a right direction 294 controls the difference in rotation speed of the gear disks 80a. The joystick 264 can move away from center both in the forward direction 288 or the backward direction 290 and in the left direction 292 or the right direction 294 simultaneously to drive the rear wheel 40 simultaneously forward or backward, and left or right. Pivoting of the joystick 264 in the forward direction 288 or the backward direction 290 away from the center position C is resisted less than movement of the joystick 264 in the left direction 292 or the right direction 294 away from center in order to require a conscious effort of the user to cause lateral movement and to avoid accidental lateral movement.

FIG. 10 shows the mappings between positions of the joystick 264 and the rotation directions of the gear disks 80a, 80b as shown in FIGS. 11A to 11D.

FIGS. 11A to 11D are rear views of the rear wheel 40 illustrating its operation, wherein both gear disks 80a rotate in a forward rotational direction (i.e., the rotational direction of the rear wheel 40 to drive the rear wheel 40 forward across a surface), both rotate in a backward rotational direction (i.e., the direction of rotation of a wheel to move a vehicle backward), the first gear disk 80a rotates in a forward rotational direction and the second gear disk 80b rotates in a backward rotational direction, and the first gear disk 80a rotates in a backward rotational direction and the second gear disk 80b rotates in a forward rotational direction.

The angular velocity of the rear peripheries of the first gear disk 80a and the second gear disk 80b are illustrated as $v_1$ and $v_2$ respectively. Movement of the rear wheel 40 in the forward direction RF or the backward direction RB is determined by the average angular velocity of the gear disks 80a, 80b, as the lateral rollers 132 that contact the travel surface 224 to provide the ground contact surface of the rear wheel 40 rotate about the rear axle 68 at the average angular velocity of the gear disks 80a, 80b. If the average angular velocity (that is, the average of $v_1$ and $v_2$) represents rotation of the rear wheel 40 in a forward rotational direction (that is, the rotational direction of the rear wheel 40 to drive the rear wheel 40 forward across a surface), then the rear wheel 40 moves at least partially in a forward direction RF. Alternatively, if the average angular velocity represents rotation of the rear wheel 40 in a backward rotation direction (that is, the rotational direction of the rear wheel 40 to drive the rear wheel 40 backward across a surface), then the rear wheel 40 moves at least partially in a backward direction RB. The speed at which the rear wheel 40 moves in a forward direction RF or a backward direction RB is proportional to the speed component of the average angular velocity of the gear disks 80a, 80b. If the average angular velocity is zero, then the toy motorcycle 20 is neither driven forward or backward by the rear wheel 40.

Similarly, movement of the rear wheel 40 in the left direction RL or the right direction RR is determined by the difference in the angular velocities $v_1$ and $v_2$ of the gear disks 80a, 80b. If the angular velocities $v_1$ and $v_2$ are equal, then the rear wheel 40 is not driven laterally. If, instead, the angular velocities $v_1$ and $v_2$ are not equal, then the lateral rollers 132 also rotate about axes that are orthogonal to the rotational axis RA of the rear wheel 40 to also drive the rear wheel 40 laterally. In particular, if $v_1$ is greater in the forward rotational direction than $v_2$, then the lateral rollers 132 rotate to translate the rear wheel 40 in the left direction RL at a speed relative to the difference between $v_1$ and $v_2$. Conversely, if $v_1$ is less than $v_2$ in a forward rotational direction, then the lateral rollers 132 rotate to translate the rear wheel 40 in the right direction RR at a speed relative to the difference between $v_1$ and $v_2$.

Generally, the driving force of the rear wheel 40 across the travel surface 224 is a combination of the driving force along the forward direction RF or backward direction RB as a result of the average angular velocity of the gear disks 80*a*, 80*b*, and the driving force along the left direction RL or the right direction RR as a result of the difference in the angular velocity of the gear disks 80*a*, 80*b*. Thus, the rear wheel 40 can drive in the forward or backward direction RF that is orthogonal to the rotation axis RA of the rear wheel 40, in a right direction RR or a left direction RL that is parallel to the rotation axis RA of the rear wheel 40, and in another direction that is a combination of the forward direction RF or the backward direction RB, and the right direction RR or the left direction RL and, thus, oblique to the rotation axis RA of the rear wheel 40.

Figure 11D:
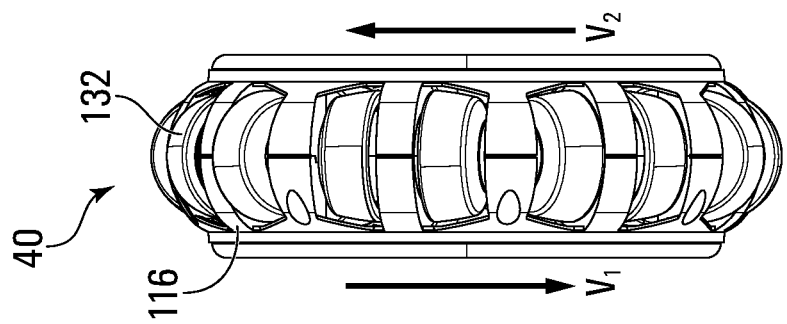
FIGS. 11A to 11D are rear views of the rear wheel of the toy motorcycle of FIGS. 1 to 7 showing operation of the rear wheel when the joystick is moved to the different directional regions shown in FIG. 10.
Figure 11C:
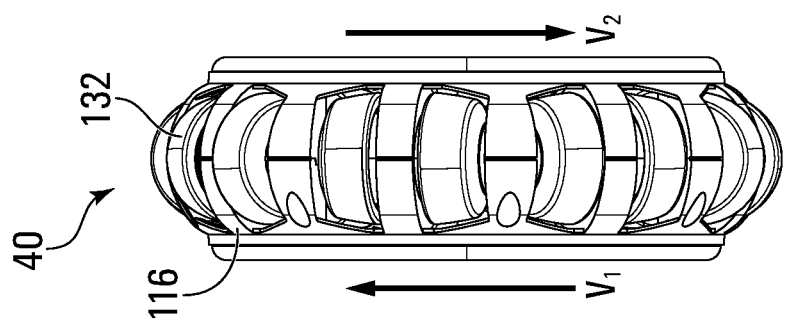
Figure 11B:
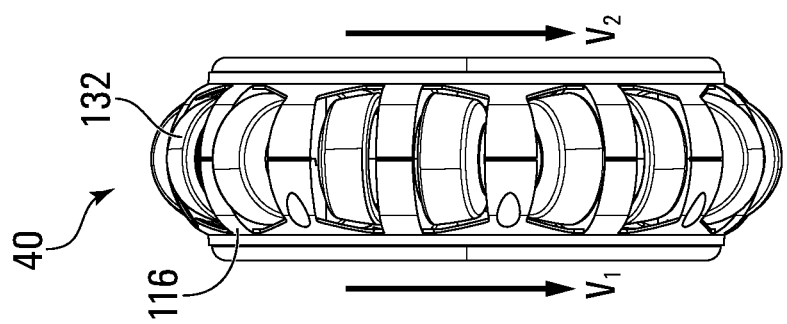
Figure 11A:
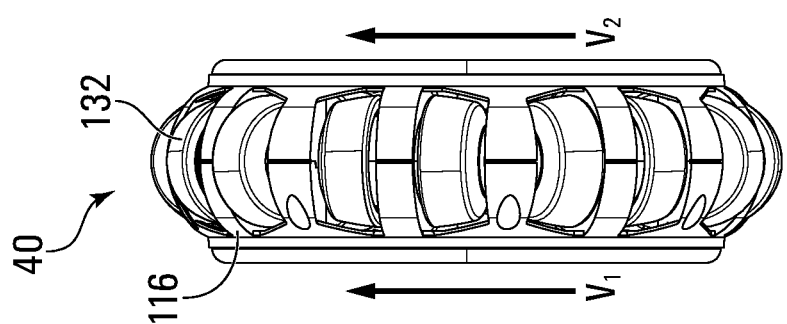

FIG. 11A shows the rear peripheries of the two gear disks 80*a* rotating in a forward rotational direction at angular velocities $v_1$ and $v_2$ respectively. As the average angular velocity will be in the forward rotational direction, the rear wheel 40 will drive in the forward direction RF across the travel surface 224. The rear wheel 40 may also simultaneously drive laterally, depending upon the difference between $v_1$ and $v_2$.

FIG. 11B shows the rear peripheries of the two gear disks 80*a* rotating in a backward rotational direction at angular velocities $v_1$ and $v_2$ respectively. As the average angular velocity will be in the backward rotational direction, the rear wheel 40 will drive in the backward direction RB across the travel surface 224. The rear wheel 40 may also simultaneously drive laterally, depending upon the difference between $v_1$ and $v_2$.

FIG. 11C shows the rear periphery of the first gear disk 80*a* rotating in a forward rotational direction at angular velocity $v_1$ and the rear periphery of the second gear disk 80*b* rotating in a backward rotational direction at angular velocity $v_2$. If the average angular velocity (that is, the average of $v_1$ and $v_2$) represents rotation of the rear wheel 40 in a forward rotational direction, then the rear wheel 40 drives in a forward direction RF. Alternatively, if the average angular velocity represents rotation of the rear wheel 40 in a backward rotation direction, then the rear wheel 40 drives in a backward direction RB. The speed at which the rear wheel 40 drives in a forward direction RF or a backward direction RB is proportional to the speed component of the average angular velocity of the gear disks 80*a*, 80*b*. Additionally, the rear wheel 40 also simultaneously drives laterally in a direction determined by the difference between $v_1$ and $v_2$ at a speed proportional to the difference between $v_1$ and $v_2$.

FIG. 11D shows the rear periphery of the first gear disk 80*a* rotating in a backward rotational direction at angular velocity $v_1$ and the second gear disk 80*b* rotating in a forward rotational direction at angular velocity $v_2$. If the average angular velocity represents rotation of the rear wheel 40 in a forward rotational direction, then the rear wheel 40 drives in a forward direction RF. Alternatively, if the average angular velocity represents rotation of the rear wheel 40 in a backward rotation direction, then the rear wheel 40 drives in a backward direction RB. The speed at which the rear wheel 40 drives in a forward direction RF or a backward direction RB is proportional to the speed component of the average angular velocity of the gear disks 80*a*, 80*b*. Additionally, the rear wheel 40 also simultaneously drives laterally in a direction determined by the difference between $v_1$ and $v_2$ at a speed proportional to the difference between $v_1$ and $v_2$.

Referring now to FIGS. 7 to 11D, using the remote control unit 256, a user can direct the toy motorcycle 20, when turned on and in an upright position atop of a travel surface, to perform various maneuvers, such as travelling forwards or backwards in a straight line by pivoting the joystick 264 in the forward direction 288 or the backward direction 290.

The toy motorcycle 20 is self-balancing in an upright orientation via control of the rear wheel control motors 56*a*, 56*b* and the front wheel steering motor 242 by the control module 228. The control module 228 receives orientation and acceleration data from the sensors 248, as well as the drive commands received from the remote control unit 256, and determines how to control operation of the composite rear wheel 40 and the front wheel steering motor 242 controlling pivoting of the front wheel 28 to maintain the toy motorcycle 20 upright. The composite rear wheel 40 can be controlled to drive backwards or forwards, and simultaneously left or right by independent operation of the gear disks 80*a*, 80*b*, and the front wheel 28 can be operated to pivot to maintain the center-of-gravity generally over the area of contact between the front wheel 28, the rear wheel 40, and the travel surface 224.

When the toy motorcycle 20 is turned on, allowed to calibrate, and placed upright atop of a travel surface, the control module 228 receives orientation and acceleration data from the sensors 248 and, in response, determines how to modify control of the left motor 56*a*, the right motor 56*b*, and the front wheel steering motor 242 to maintain the center-of-gravity of the toy motorcycle 20 over the area of contact of the wheels 28, 40 with the travel surface 224. This can include modifying or ignoring the operational commands received from the remote control unit 256.

Figure 12:
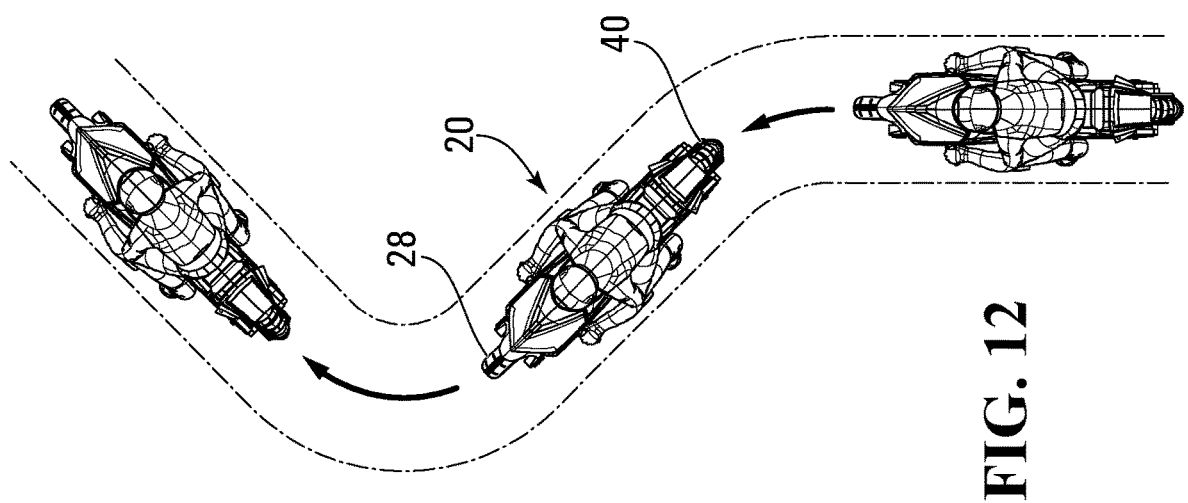
FIG. 12 shows a winding travel path of the toy motorcycle of FIGS. 1 to 7.

FIG. 12 shows operation of the toy motorcycle 20 so that the toy motorcycle 20 appears to be making a series of alternating turns in an s-shaped pattern. The toy motorcycle 20 can travel forwards or backwards along an s-shaped path by steering the front wheel 28 via the steering wheel 260 of the remote control unit 256 while pivoting the joystick 264 in the forward direction 288 or the backward direction 290 respectively.

This general maneuver can also be achieved by maintaining the front wheel straight (by not turning the steering wheel 260 on the remote control unit 256) and by alternating the joystick 264 between left and right of center C while the joystick 264 is urged in the forward direction 288 or the backward direction 290. This causes the rear wheel 40 to swing around alternatingly. Thus, as the rear wheel 40 is capable of lateral movement, front wheel steering can be mimicked.

Figure 13:
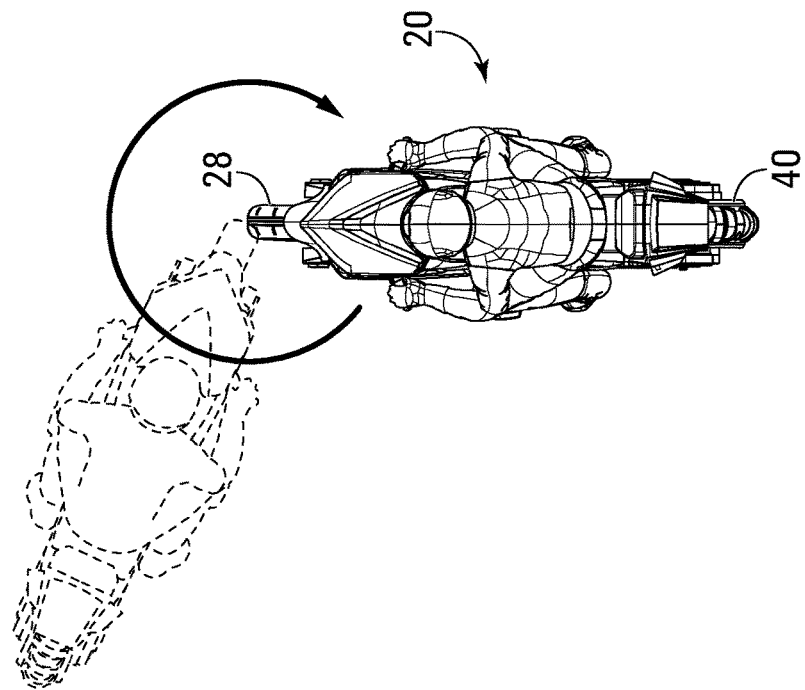
FIG. 13 shows a rotational travel path of the toy motorcycle of FIGS. 1 to 7.

FIG. 13 shows the toy motorcycle 20 rotating about the front wheel 28 by operation of the rear wheel 40 in such a manner that the average angular velocity of the gear disks 80*a*, 80*b* is zero, but the left gear disk 80*a* is rotated in a forward rotational direction and the right gear disk 80*b* is rotated in a backward rotational direction, as shown in FIG. 11C.

Figure 14:
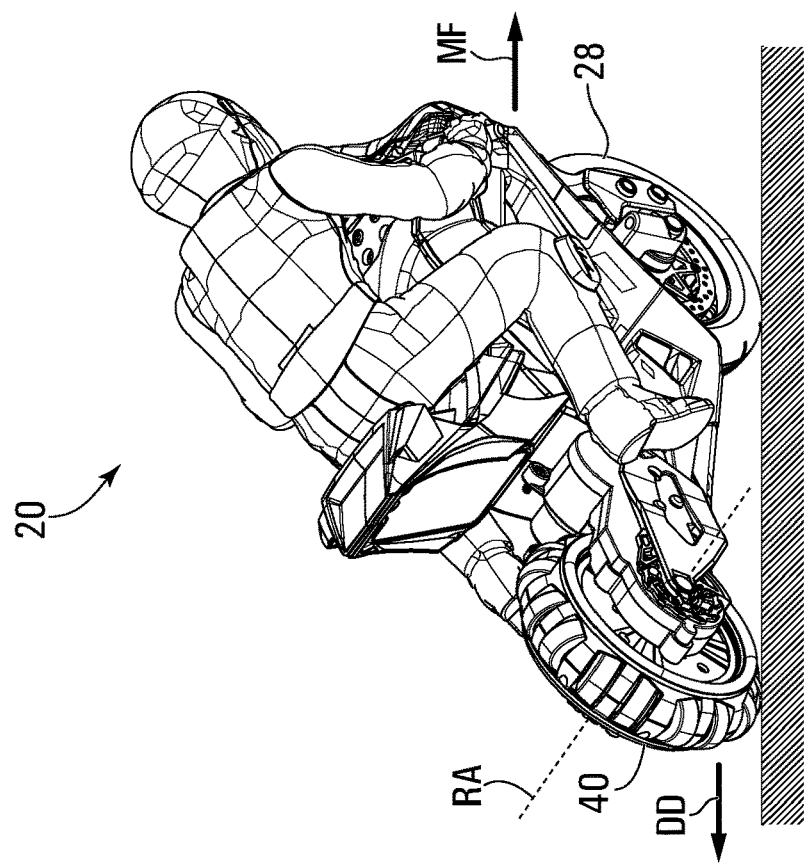
FIG. 14 shows the toy motorcycle of FIGS. 1 to 7 in a drifting driving orientation.

FIG. 14 shows the toy motorcycle 20 being operated to simulate "drifting" or controlled oversteer by steering the front wheel 28 in one direction MF (i.e., left or right) and causing the rear wheel 40 to move both forward and in the same direction in which the front wheel 28 is being steered using the joystick 264. As a result, the rear wheel 40 is moved in a direction DD that is oblique to the rotation axis RA of the rear wheel 40.

Figure 15:
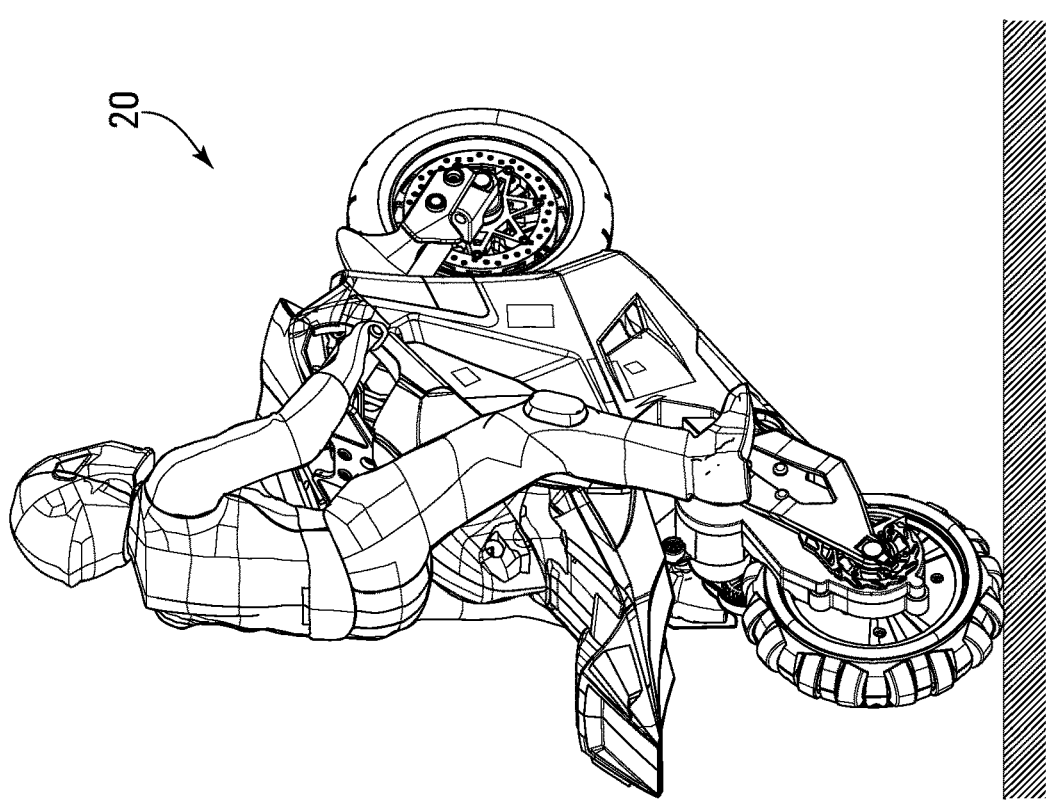
FIG. 15 shows the toy motorcycle of FIGS. 1 to 7 being operated to balance on the rear wheel.

FIG. 15 illustrates the toy motorcycle 20 performing a "wheelie", wherein the toy motorcycle 20 is reoriented to travel upon the rear wheel 40 only. This is achieved by actuating the wheelie button 268 of the remote control unit 256. Upon actuation of the wheelie button 264, the control module, upon receiving an operational command in the form of a wheelie command generated by the remote control unit 256, controls the motors 56a, 56b to cause the toy motorcycle 20 to accelerate straight backwards for a set time or until a minimum speed is reached, and then accelerate quickly forwards. The inertia of the upper portion of the toy motorcycle 20 resists the forward acceleration and the toy motorcycle 20 is reoriented so that the toy motorcycle 20 is balancing on the rear wheel 40 only (i.e., performs a wheelie). The control module 228 determines how to control the motors 56a, 56b to maintain the center-of-gravity of the toy motorcycle 20 over the area of contact of the front wheel 28 and the rear wheel 40 with the travel surface 224. As there is no contact of the front wheel 28 with the travel surface 224 in this orientation, the control module 228 maintains the center-of-gravity of the toy motorcycle 20 over the area of contact of the rear wheel 40 with the travel surface 224. The rear wheel 40 can move in a forward direction RF or a backward direction RB, and in a left direction RL or a right direction RR, or any combination of a forward direction RF or a backward direction RB, and in a left direction RL or a right direction RR in order to maintain the center-of-gravity over the area of contact of the rear wheel 40 with the travel surface 224.

Alternatively, a user could employ the joystick 264 to perform the same sequence of actions without actuating the wheelie button 268. Still further, the toy motorcycle 20 could be placed on a surface such that the toy motorcycle 20 is generally in a wheelie orientation (that is, with its center-of-gravity positioned over the area of contact of its rear wheel 40 with the travel surface 224), and the control module 228 can recognize its orientation and control the motors 56a, 56b and the front wheel steering motor 242 to maintain this orientation. In this case, the control module 228 may recognize the wheelie orientation (that is, the orientation of the toy motorcycle 20 when the center-of-gravity is above the area of contact of the rear wheel 40 with the travel surface) and control the rear wheel 40 (and the pivoting of the front wheel, in some cases) to maintain the center-of-gravity over the area of contact of the rear wheel 40 with the travel surface.

Referring now to FIGS. 7 to 15, during the performance of all of these maneuvers, the control module 228 continually processes the orientation and acceleration information from the sensors 248 and determines how to maintain the center-of-gravity over the area of contact of the wheels 28, 40 with the travel surface 224 by adjusting the operation of the left and right motors 56a, 56b controlling the composite rear wheel 40, and operation of the front wheel steering motor 242 controlling the pivoting of the front wheel 28. As a result, the two-wheeled toy motorcycle 20 is able to maintain itself upright where the toy motorcycle 20 would otherwise tip over.

Figure 16:
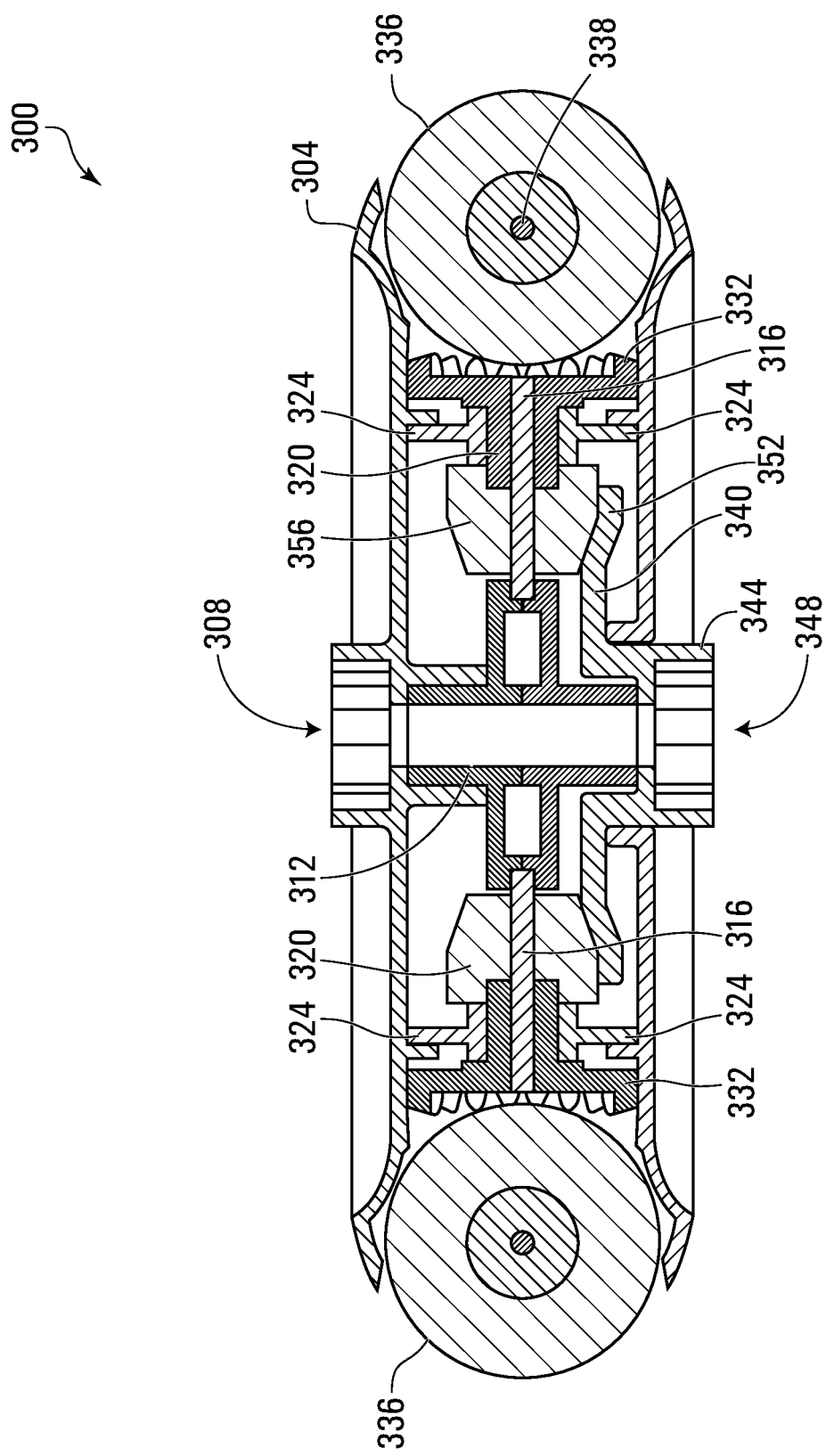
FIG. 16 is a top sectional view of a rear wheel of a toy motorcycle in accordance with another embodiment.
Figure 17:
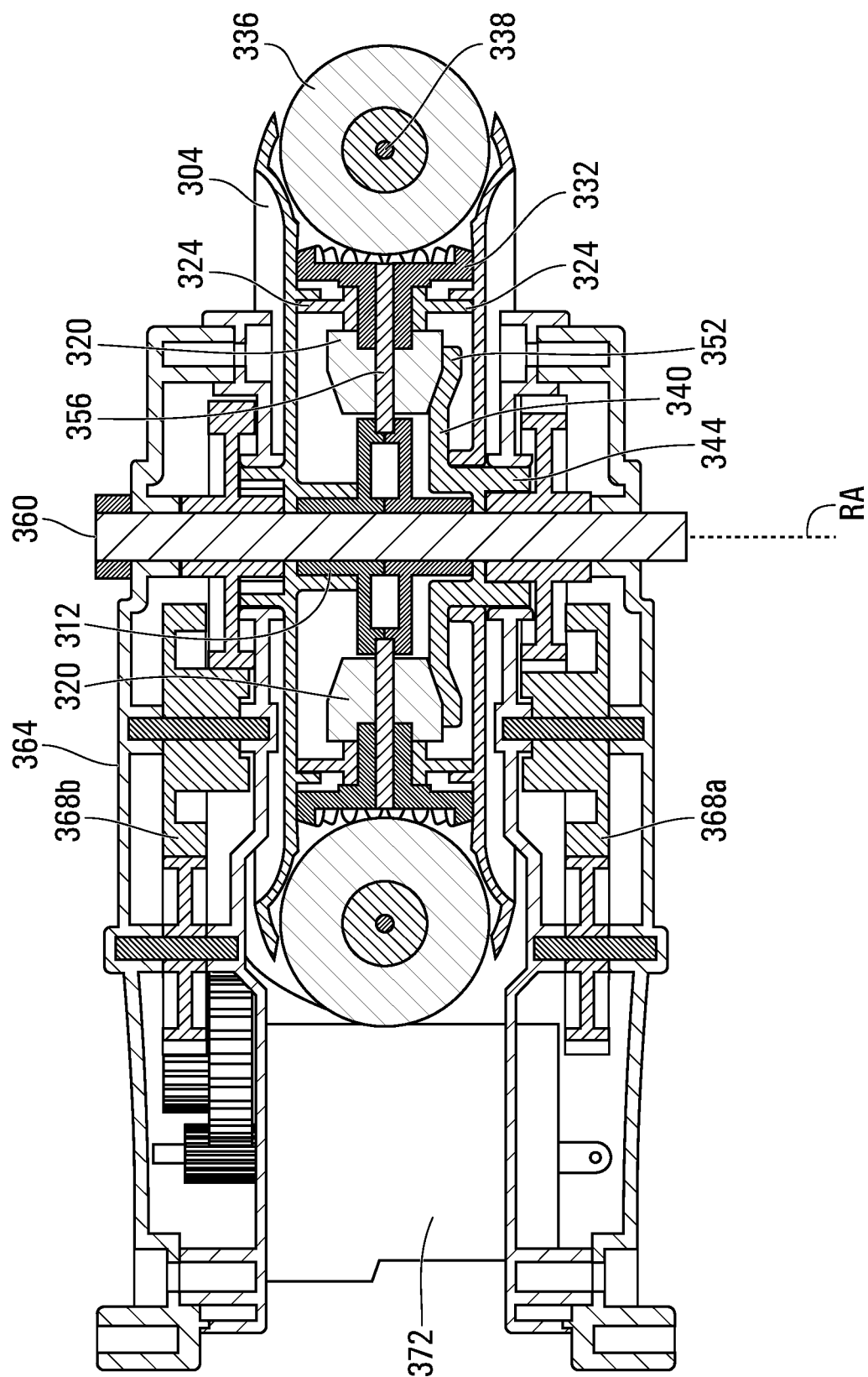
FIG. 17 is a top sectional view of the rear wheel and rear wheel support of the toy motorcycle of FIG. 16 showing the drive arrangements driving the rear wheel.

FIGS. 16 and 17 show a composite rear wheel 300 of a toy motorcycle in accordance with another embodiment. The composite rear wheel 300 has an exterior shell 304 similar to the shell of the rear wheel 40 formed by the shell portions 116 of the toy motorcycle 20 of FIGS. 1 to 6, with a few exceptions. The exterior shell 304 is driven via a drive interface in the form of a non-round drive recess 308 on a first side, and has a hub 312 with a fixed orientation therein. The hub 312 has a plurality of radial axles 316 atop of which are freely rotatably mounted a set of transmission translation members 320. Secured to the inside the exterior shell 304 are positioning rings 324 that have a set of apertures in which necks 328 of the transmission translation members 320 are secured. Each of the transmission translation members 320 has a peripheral gear face 332 that turns a lateral roller 336 on a roller axle 338 in a similar manner as in the embodiment illustrated in FIGS. 1 to 7. The lateral rollers 336 are at fixed positions relative to the exterior shell 304.

A gear disk 340 is freely rotatably positioned within the exterior shell 304, and has a projection bracket 344 that extends through a round aperture in a second side of the exterior shell 304. The projection bracket 344 has a drive interface in the form of a non-round drive recess 348 for driving the gear disk 340. The gear disk 340 has a toothed gear face 352 that engages a frustoconical gear 356 of the transmission translation member 320.

The hub 312 and the gear disk 340 are freely rotatably mounted on a rear axle 360 that is secured to a rear wheel support 364. A first drive arrangement 368a includes a motor (hidden) and is coupled to the gear disk 340 to drive the gear disk 340. A second drive arrangement 368b includes a motor 372 and is coupled to the exterior shell 304 to drive the exterior shell 304. The second drive arrangement 368b drives rotation of the rear wheel 300 and thus the set of lateral rollers 336 about the rotation axis RA of the rear wheel 300.

If the gear disk 340 is rotated with the same angular velocity as the exterior shell 304, then the toothed gear face 352 does not move relative to the frustoconical gears 356 of the transmission translation members 320. As a result, the lateral rollers 336 do not rotate about the roller axles 338 to drive the rear wheel 300 laterally. If, instead, the gear disk 340 is rotated at a different angular velocity than is the exterior shell 304, then the toothed gear face 352 rotates relative to the frustoconical gears 356 of the transmission translation members 320, causing them to rotate about the roller axles 338 to drive the rear wheel laterally. Thus, from a drive arrangement perspective, the rear wheel 300 is driven in generally the same manner as is the rear wheel 40 of the toy motorcycle 20 of FIGS. 1 to 6 and the rear wheel 40 of the toy motorcycle 20 of FIG. 7, with the exception that greater forward angular velocity applied by the first drive arrangement 368a to the gear disk 340 relative to the angular velocity of the second drive arrangement 368b to the exterior shell 304 results in lateral movement in a right direction RR.

In an alternative embodiment, a toy motorcycle similar to the toy motorcycle 20 of FIGS. 1 to 15 may be provided that does not have a steering mechanism to control of the orientation of the front wheel, like the toy motorcycle of FIGS. 1 to 15. That is, the front wheel of the toy motorcycle in this alternative embodiment is in a fixed orientation relative to the body thereof. The toy motorcycle without front wheel orientation control can maintain its center-of-gravity positioned over the area of contact between the front and rear wheels and a travel surface solely through control of its motors (similar to motors 56a, 56b of the toy motorcycle 20 of FIGS. 1 to 15) that operate its composite rear wheel. The toy motorcycle in this alternative embodiment is capable of performing all of the same maneuvers as the toy motorcycle 20 of FIGS. 1 to 15, but may not possess the stability of the toy motorcycle 20 while simulating a drifting maneuver as its front wheel is in a fixed orientation.

In some embodiments, the sensors of the self-balancing two-wheeled vehicle can only determine orientation and the control module can determine how to control the motors driving the rear wheel and the front wheel steering motor only using orientation data.

The front wheel may also be constructed and controlled like the rear wheel.

A single continuous lateral roller that is rotatable can be used in place of multiple lateral rollers. In this case, the axis about which the single continuous lateral roller rotates is a curved axis that is generally at each point orthogonal to a rotation axis of the second wheel.

While it has been shown that the rear wheel includes one or more lateral rollers and is controlled by at least one rear wheel control motor, and that the front wheel is optionally steerable via a front wheel steering motor, it is alternatively possible for the self-balancing vehicle to have a different structure, wherein the rear wheel is pivotable and is controlled by a rear wheel steering motor and for the front wheel to include the lateral rollers which are driven by at least one front wheel control motor. Thus, the wheel that steers via pivoting need not be the front wheel, and may be referred to as a first wheel, and the other wheel, which includes lateral rollers, may be referred to as a second wheel. Similarly the front wheel steering motor may be referred to as a first wheel steering motor, and similarly the at least one rear wheel control motor (e.g. the first and second rear wheel control motors) may be referred to as at least one second wheel control motor or at least one motor coupled to the second wheel.

Persons skilled in the art will appreciate that there are yet more alternative implementations and modifications possible, and that the above examples are only illustrations of one or more implementations. The scope, therefore, is only to be limited by the claims appended hereto.

What is claimed is:

1. A self-balancing two-wheeled vehicle, comprising:
 a body;
 a first wheel rotatably coupled to the body;
 a second wheel rotatably coupled to the body, the second wheel having a plurality of lateral rollers rotatable about a roller axis that is one of oblique and orthogonal to a rotation axis of the second wheel;
 at least one motor coupled to the second wheel to control rotation of the second wheel and the plurality of lateral roller;
 at least one sensor coupled to the body to generate orientation data therefor; and
 wherein the second wheel has a first drive interface and a second drive interface to which the at least one motor is coupled, the first drive interface being rotatable independent of the second drive interface, and wherein the second drive interface is uncoupled from rotation of the second wheel about a rear axle,
 wherein the at least one motor includes a first motor coupled to the first drive interface and a second motor coupled to the second drive interface,
 wherein the first drive interface includes a first gear face and the second drive interface includes a second gear face that faces the first gear face,
 wherein each lateral roller from the plurality of lateral rollers has a roller gear, and is rotatable by a transmission translation member that includes a first gear that is engaged with both the first and second gear faces, and a peripheral gear face, wherein the peripheral gear face is engaged with the roller gear from each lateral roller of the plurality of lateral rollers, such that relative rotation between the first and second gear faces drives rotation of the lateral rollers,
 wherein a control module is coupled to the at least one sensor and to the first and second motors to control the relative rotation between the first and second gear faces so as to drive rotation of the lateral rollers in order to maintain a center-of-gravity of the self-balancing two-wheeled vehicle over an area of contact of the first wheel and the second wheel with a travel surface so as to balance the self-balancing two-wheeled vehicle at least partially based on the orientation data generated by the at least one sensor.

2. A self-balancing two-wheeled vehicle as claimed in claim 1, wherein the at least one sensor includes an accelerometer that generates acceleration data, and wherein the control module controls operation of the at least one motor at least partially based on the accelerometer data received from the accelerometer.

3. A self-balancing two-wheeled vehicle as claimed in claim 1, further comprising a receiver coupled to the control module to communicate operational commands received from a remote control unit to the control module, the remote control unit having a set of user controls and communicating the operational commands generated by actuation of the user controls,
 wherein the first wheel is pivotable relative to the body, and wherein pivoting of the first wheel is controlled by the control module at least partially based on the operational commands received from a remote control unit.

4. A self-balancing two-wheeled vehicle as claimed in claim 3, wherein pivoting of the first wheel is at least partially controlled by the control module to maintain the center-of-gravity of the self-balancing two-wheeled vehicle over the area of contact of the first wheel and the second wheel with the travel surface.

5. A self-balancing two-wheeled vehicle as claimed in claim 3, wherein the operational commands comprises a wheelie command, and wherein the remote control unit, upon receiving the wheelie command from the remote control unit, controls the second wheel to accelerate in a first direction away from the first wheel and immediately subsequently accelerate in a second direction towards the front wheel to reorient the self-balancing two-wheeled vehicle so that the center-of-gravity of the self-balancing two-wheeled vehicle is over the area of contact of the second wheel with the travel surface, wherein the control module controls the at least one motor at least partially to maintain the center-of-gravity of the self-balancing two-wheeled vehicle is over the area of contact of the second wheel with the travel surface.

* * * * *